Figure 1:
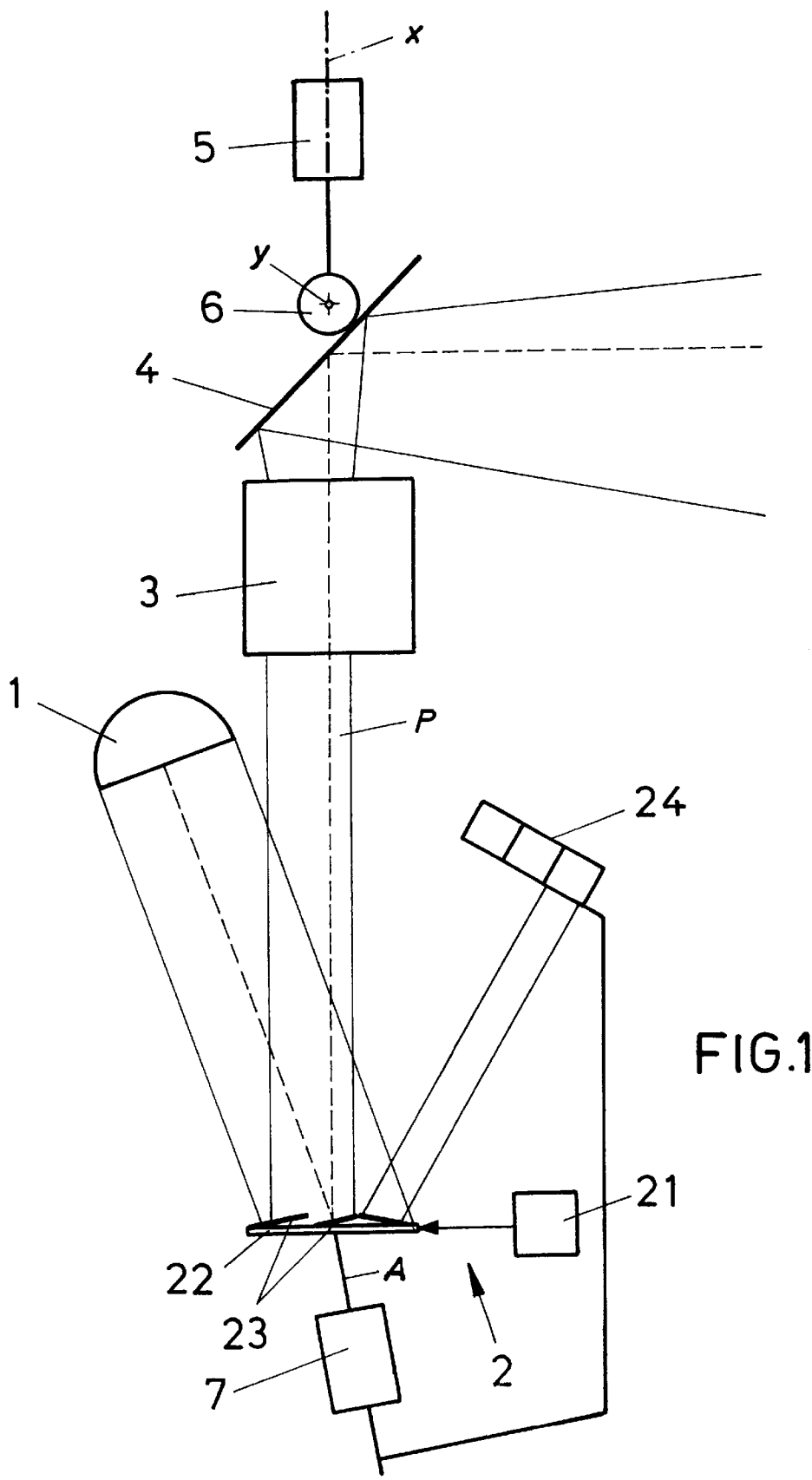

United States Patent
Jessl

[11] Patent Number: 6,099,128
[45] Date of Patent: Aug. 8, 2000

[54] METHOD OF SPATIALLY MOVING A PROJECTION BEAM FROM A VIDEO OR GRAPHICS PROJECTOR

[76] Inventor: Rainer Jessl, Reitherstrasse 1, A-4060 Leonding, Austria

[21] Appl. No.: 09/284,702

[22] PCT Filed: Oct. 21, 1997

[86] PCT No.: PCT/AT97/00226

§ 371 Date: Apr. 19, 1999

§ 102(e) Date: Apr. 19, 1999

[87] PCT Pub. No.: WO98/18037

PCT Pub. Date: Apr. 30, 1998

[30] Foreign Application Priority Data

Oct. 21, 1996 [AT] Austria .................................... 1840/96

[51] Int. Cl.[7] .................................................. G03B 21/28
[52] U.S. Cl. .............................. 353/51; 353/99; 353/121; 359/223
[58] Field of Search .................................. 353/37, 46, 50, 353/51, 98, 99, 121, 7.1; 359/212, 220, 221, 223; 348/742, 771, 743

[56] References Cited

U.S. PATENT DOCUMENTS

| | | |
|---|---|---|
| 3,170,978 | 2/1965 | Balding . |
| 3,453,043 | 7/1969 | Anthony ................................ 353/98 |
| 4,235,535 | 11/1980 | Prinz et al. . |
| 4,645,318 | 2/1987 | Trumbull . |
| 4,702,699 | 10/1987 | Nordberg . |
| 5,196,875 | 3/1993 | Stückler ................................ 353/97 |
| 5,365,288 | 11/1994 | Dewald et al. ....................... 353/98 |
| 5,400,095 | 3/1995 | Minich et al. . |
| 5,537,251 | 7/1996 | Shimada . |
| 5,828,485 | 10/1998 | Hewlett ............................... 359/291 |
| 5,831,601 | 11/1998 | Vogeley et al. .................... 345/175 |
| 5,864,417 | 1/1999 | Ho ....................................... 359/201 |
| 5,917,558 | 6/1999 | Stanton .............................. 348/743 |
| 5,967,636 | 10/1999 | Stark et al. .......................... 353/84 |

FOREIGN PATENT DOCUMENTS

| | | |
|---|---|---|
| 2 265 064 | 9/1993 | United Kingdom . |
| WO94/08425 | 4/1994 | WIPO . |

*Primary Examiner*—William Dowling
*Attorney, Agent, or Firm*—Collard & Roe, P.C.

[57] ABSTRACT

In order to move spatially the projection beam from a video or graphics projector, the projection beam which emerges from a light source and is guided via and/or through an optoelectronic image generator and through a projection lens is deflected by means of at least one mirror which can be pivotably displaced about two axes, an X-axis extending in the direction of incidence of the projection beam and a transverse Y-axis. In order to attain perfect correction of the image distortion caused by rotation in spite of the rapid movement of the mirror, the images to be projected from the image generator are further rotated when the mirror is pivotably adjusted about the X-axis in forced coupling with the pivotal adjustment of the mirror in order to compensate any image distortion occurring.

8 Claims, 2 Drawing Sheets

METHOD OF SPATIALLY MOVING A PROJECTION BEAM FROM A VIDEO OR GRAPHICS PROJECTOR

This invention relates to a method for the three-dimensional movement of the projection beam of a video or graphics projector, wherein the projection beam coming from a light source and guided over and/or through an optoelectronic image generator and through a projection lens is deflected by means of at least one mirror to be swivelled about two axes, an X-axis extending in direction of incidence of the projection beam and a transversely extending Y-axis.

Video or graphics projectors, which provide for the projection of video images or computer graphics, have so far mostly been used for a still projection onto a given projection surface by means of a projection beam fixedly aligned with respect to this projection surface, so that these projections are bound to firmly preadjusted image positions. The application of video and graphics projections for show, advertising and simulation purposes, however, requires a three-dimensional movement of the projection beam and thus a fast movability of the precisely positionable projection beam, for which purpose it would basically be possible to support the projector in a swivel-mounted revolving shackle, which leads, however, only to a slow, low-power motional projection impaired by vibrations.

In order to achieve fast light effects and good projections moving in three dimensions, it has also already been proposed to deflect the projection beam behind the projection lens by means of a swivel-mounted mirror, but when swivelling the mirror about an axis of rotation extending in direction of incidence of the projection beam, a fundamental imaging problem arises, as the projection image also rotates in dependence on the position of the mirror, until it is upside down after a rotation of the mirror by 180°. To correct this aberration, the projection beam is rotated about the beam axis behind the image generator by means of mirrors or optical prisms in accordance with WO 94/08425 or U.S. Pat. No. 4,235,535, so as to be able to project the projected image without aberrations. However, optically influencing the projection beam in this way requires a considerable constructional effort, requires a corresponding construction space, increases the light losses during the projection, and involves additional sources for optical defects, which lead to an impairment of the production quality.

It is therefore the object underlying the invention to provide a method as described above, which in an economic and inexpensive way provides for extremely fast motional projections with a perfect compensation of the aberrations resulting from the rotation of the mirror, and in addition offers the possibility for further influencing the images to be projected.

This object is solved by the invention in that when the mirror is swivelled about the X-axis, the images to be projected, which were produced by the image generator, are additionally rotated in a forced coupling with the swivel movement of the mirror, in order to compensate the occurring aberration. By means of this both simple and elegant measure the image to be projected is itself influenced in the sense of a compensation of defects, and to compensate an aberration resulting from the swivelling of the mirror, it is tracked with a fixed angle with respect to this swivel movement. In this way, special optical means for influencing the already image-bearing projection beam are avoided, and optimum projection qualities are ensured with relatively little constructional effort and space requirement.

A particularly advantageous possibility for an additional rotation of the image is obtained when the images of the image generator are rotated by means of a digital special-effects processor with a function "rotation normal to the image plane", which activates the image generator. This processor known per se in video technology or from GB 22 65 064 A offers a simple means for activating the optoelectronic image generator corresponding to the specific functions of the processor and, by means of the function "rotation normal to the image plane", for producing the image of the image generator already in the rotary position required for image correction. For the image generator, every technology suitable for video or graphics projections may be used, for instance LCD (Liquid Crystal Display), DMD (Digital Micromirror Device), CRT (Cathode Ray Tube), ILA (Image Light Amplifier), Light-Valve Technology and the like, as the processor influences the image signals activating the image generator and need therefore not interfere in the actual function of the image generator.

When a special-effects processor is associated to the image generator, the images of the image generator can additionally be influenced or changed by means of this processor with respect to brightness, dimensioning, magnification, masking, colour adjustment, rectifications or the like, which correspondingly widens the applications and possibilities of a motional projection and in addition to the correction of aberrations also provides for an adjustment of the image impression, the image size, the image format, and the like. The image can thus for instance also be covered (masked) or reduced such that by rotating the image the frame of the image generator is not crossed, and the entire image can also be projected in a rotated position. Without an additional effort, all functions of the processor can thus also be utilized for the notional projection.

A further possibility for an additional rotation of the image is obtained in that an image carrier for the images to be projected, which were produced by the image generator, is rotated itself for additionally rotating the images. Such image carrier, on which the image to be projected is formed, need merely be rotated about the X-axis by means of an electromechanical rotating mechanism in a forced coupling with the rotation of the mirror, which in turn leads to a perfect compensation of the aberration resulting from the rotation.

When there is provided an image generator in accordance with the DMD technology of Texas Instruments, whose image carrier accommodates a plurality of tiltable mirror elements, the image carrier is rotated about an axis of rotation normal to the respective image-effective mirror elements, so that despite the tilted position of the activated mirror elements the image to be projected is also formed in a rotated position. In accordance with the DMD technology, the mirror elements associated to each image point are tilted by activating the same such that the projection beam is directed through these mirror elements to the projection lens. The non-activated, image-ineffective mirror elements remain tilted in opposite directions, so that the impinging light beams are deflected to a light absorber beside the projection lens and provide no image points. So as not to endanger this image-forming reflection principle by a rotary adjustment, the axis of rotation of the image carrier accommodating the mirror elements must be moved about an axis of rotation normal to the image-effective mirror elements. In addition, the absorber for the deflected image-ineffective light beams must likewise be rotated or have a correspondingly ring-shaped design.

In accordance with a particularly advantageous aspect of the invention, the special-effects processor associated to the image generator is activated via a control assembly, which at the same time activates the swivel drives of the mirror, adjusting means of the projection lens, control means of the light source, and possibly the rotary drive for the image carrier. The projector can thus be activated by means of the control assembly not only with respect to the correction of aberrations, but also with respect to actual projector functions, so that by means of this control assembly the mirror rotations, the focussing of the projection lens, the zoom function of this lens, the brightness of the light source or the projection beam, the various functions of the processor itself and the like can be controlled and adjusted.

By means of such a control assembly it is then possible to provide for the activation of the control assembly itself via an external control device, preferably in accordance with a predeterminable program, which for instance allows for an activation of this control device via a lighting control desk of a stage, so that the video or graphics projector can be used and operated similar to a spotlight in connection with a complex lighting program.

Figure 2:
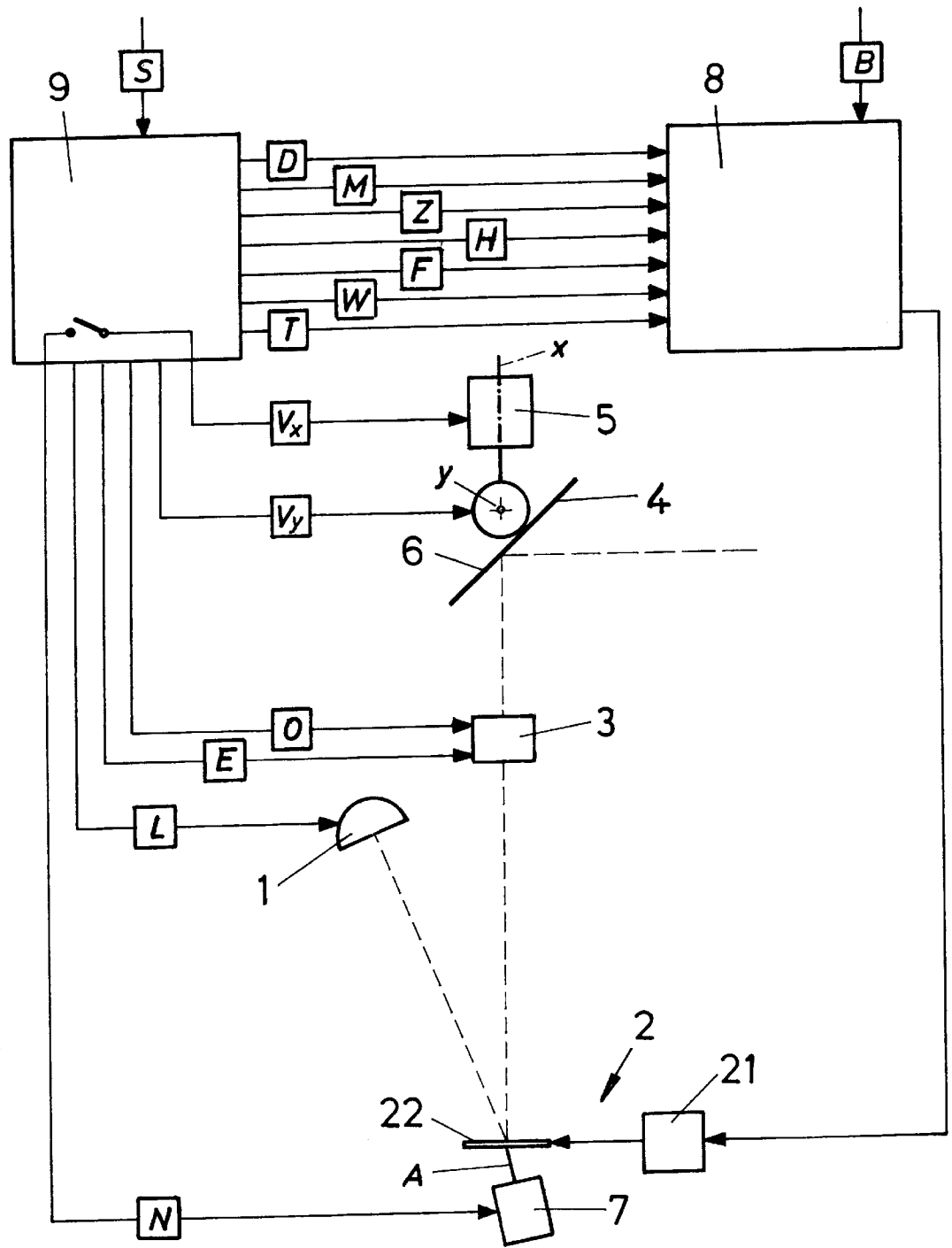

In the drawing, the subject-matter of the invention is represented by way of example, wherein:

FIG. 1 is a schematical representation of a video projector for performing the inventive method, and FIG. 2 is a block circuit diagram of the control structure of this projector.

During the motional projection of video images or computer graphics, a projection beam P processed by reflectors and lenses not represented in detail is guided from a light source 1 over an optoelectronic image generator 2 and through a projection lens 3, behind which a mirror 4 with two electromechanical rotating mechanisms 5, 6 for rotating the mirror about an X-axis extending in direction of incidence of the projection beam and about a transversely extending Y-axis is provided for the three-dimensional movement of the projection beam, from which mirror 4 the image-bearing projection beam then impinges on not represented screens, objects, persons or any other media, corresponding to the deflection. For the purpose of image formation, the image generator 2 operates according to the DMD technology of Texas Instruments and comprises on the one hand an image signal generator 21 and an image carrier 22, which image carrier 22 has a plurality of tiltable mirror elements 23, which are activated by means of the image signal generator 21 in dependence on the images to be projected such that the image-effective mirror elements 23 reflect the incident light beams of the projection beam towards the projection lens 3, whereas the ineffective mirror elements direct the light beams towards a light absorber 24.

In order to correct the aberrations resulting from swivelling the mirror 4 about the X-axis, the image carrier 22 of the image generator 2 is additionally rotated under a fixed angle together with the swivel movement of the mirror 4, where the image carrier 22 is rotated by means of a rotating mechanism 7 about an axis of rotation A normal to the effective mirror elements 23, so as not to impair the image-forming effect of the mirror elements. The light absorber 24 is also rotated, so as to intercept the image-ineffective light beams independent of the rotary position of the image carrier 22.

As is illustrated in FIG. 2, the control structure for the motional projection comprises a special-effects processor 8 associated to the image generator 2 and a control assembly 9, where the processor 8 is activated on the one hand by image signals B of a video apparatus or a computer for forming the images to be projected, and on the other hand by the control assembly 9 with respect to the functions of the processor 8, such as rotation of the image signal D, masking of the image signal M, zooming of the image signal Z, brightness of the image signal H, colour surface signals F, angle signal in dependence on the rotary position W of the mirror and keystone rectification of the image signal T. According to these parameters, the processor 8 itself influences the image generator 2, which produces a corresponding image on the image carrier 22. Along with the activation of the processor 8 and in dependence on control signals S provided by an external control device not represented in detail, the control assembly 9 additionally activates via control lines V, O, E, L, N the rotating mechanisms 5, 6 of the mirror 4 for rotating the same about the X-axis and the Y-axis, the adjusting means of the projection lens 3 for focussing and for optically zooming the projection image, the light source 1 for influencing the brightness, and possibly the rotating mechanism 7 for additionally rotating the image carrier 22 corresponding to the X-adjustment of the mirror 4.

What is claimed is:

1. A method for the three-dimensional movement of the projection beam of a video or graphics projector, comprising the steps of (a) guiding a projection beam coming from a light source by an optoelectronic image generator producing an image through a projection lens to a mirror, (b) deflecting the projection beam by the mirror which is adapted to be swivelled about an X-axis extending in the direction of incidence of the projection beam on the mirror and a Y-axis extending transversely to the X-axis, and (c) additionally rotating the image when the mirror is swivelled about the X-axis in a forced coupling with the swivelling of the mirror to compensate for an aberration due to the swivelling of the mirror.

2. The method of claim 1, wherein the image is additionally rotated by a digital special-effects processor adapted to activate the image generator and to rotate the image about an axis extending normal to the image plane.

3. The method of claim 2, wherein the processor influences or changes the image with respect to brightness, dimensioning, magnification, masking, color and rectification.

4. The method of claim 2, wherein the processor is controlled by a control assembly for controlling the swivelling of the mirror, for adjusting the projection lens, for controlling the light source, and for controlling the additional rotation of the image.

5. The method of claim 4, wherein the control assembly is activated by an external control device according to a program.

6. The method of claim 1, wherein the image generator comprises an image carrier, and the image carrier is rotated for the additional rotation of the image.

7. The method of claim 6, wherein the image carrier comprises a plurality of tiltable mirror elements, a respective one of the mirror elements producing the image, and the image carrier is rotated about an axis normal to the respective mirror element.

8. The method of claim 7, wherein light beams coming from the light source to the tiltable mirror elements other than the mirror element producing the image are deflected to a rotating light absorber.

* * * * *